US011347313B2

(12) United States Patent
Ghosh et al.

(10) Patent No.: US 11,347,313 B2
(45) Date of Patent: May 31, 2022

(54) FEEDBACK CONTROLLERS FOR COMPUTING DEVICES

(71) Applicant: HEWLETT-PACKARD DEVELOPMENT COMPANY, L.P., Spring, TX (US)

(72) Inventors: Sarthak Ghosh, Palo Alto, CA (US); Eric Faggin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,159

(22) PCT Filed: Oct. 2, 2018

(86) PCT No.: PCT/US2018/054030
§ 371 (c)(1),
(2) Date: Oct. 30, 2020

(87) PCT Pub. No.: WO2020/072043
PCT Pub. Date: Apr. 9, 2020

(65) Prior Publication Data
US 2021/0357032 A1 Nov. 18, 2021

(51) Int. Cl.
*G06F 3/01* (2006.01)
(52) U.S. Cl.
CPC ........ *G06F 3/016* (2013.01); *G06F 2203/015* (2013.01)
(58) Field of Classification Search
CPC .......... G06F 3/011; G06F 3/014; G06F 3/015; G06F 3/016; G06F 2203/0331; G06F 3/033–0346; G06F 2203/015; G06F 3/03543
See application file for complete search history.

(56) References Cited

U.S. PATENT DOCUMENTS

| 4,665,900 | A | 5/1987 | Saringer |
| 4,962,756 | A | 10/1990 | Shamir |
| 5,067,479 | A | 11/1991 | Saringer |
| 6,334,852 | B1 | 1/2002 | Seyl |
| 6,429,849 | B1* | 8/2002 | An ......................... G05G 9/047 345/161 |
| 9,744,449 | B2 | 8/2017 | Black et al. |
| 2003/0025723 | A1* | 2/2003 | Olien ...................... G06F 3/016 715/701 |
| 2010/0245237 | A1 | 9/2010 | Nakamura |
| 2014/0240109 | A1 | 8/2014 | Aviles et al. |
| 2019/0354183 | A1* | 11/2019 | Swindells ............... A63F 13/21 |

OTHER PUBLICATIONS

Angelo D'Argenio, "VR Terms You Should Know".
Inrak Choi, Heather Culbertson, Mark R. Miller, Alex Olwal, Sean Follmer, "Grabity: a Wearable Haptic Interface for Simulating Weight and Grasping in Virtual Reality", UIST 2017, Oct. 22-25, 2017. Quebec City, QC, Canada.
Road to VR, "Exploring Methods for Conveying Object Weight in Virtual Reality", Jul. 25, 2016.

\* cited by examiner

*Primary Examiner* — Sanjiv D. Patel
(74) *Attorney, Agent, or Firm* — Conley Rose PC (57) ABSTRACT

An example feedback controller for a computing device is disclosed. The feedback controller includes a sleeve to be disposed about a portion of a user's wrist. In addition, the feedback controller includes a handle to be grasped by the user's hand. Still further, the feedback controller includes a first actuator coupled to the handle and the sleeve, the first actuator to move the handle.

14 Claims, 6 Drawing Sheets

FEEDBACK CONTROLLERS FOR COMPUTING DEVICES

BACKGROUND

Computing devices may provide kinesthetic or haptic feedback to a user to enhance the user's experience. In particular, such feedback may include physical forces, pressures, vibrations, etc. that are "felt" by a user during use of the computing device in question.

BRIEF DESCRIPTION OF THE DRAWINGS

Various examples will be described below referring to the following figures.

DETAILED DESCRIPTION

The following discussion is directed to various examples. However, it should be appreciated that the examples disclosed herein have broad application, and that the discussion of any example is meant only to be exemplary of that example, and not intended to suggest that the scope of the disclosure, including the claims, is limited to that example.

The drawing figures are not necessarily to scale. Certain features and components herein may be shown exaggerated in scale or in somewhat schematic form and some details of conventional elements may not be shown in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. As used herein, the phrase "haptic feedback" refers to feedback relating to the sense of touch corresponding to the manipulation and perception of an object.

As previously described, a computing device may provide haptic feedback to a user to enhance the user's experience. Such haptic feedback is particularly useful for immersive digital environments (e.g., those provided by virtual reality devices), whereby a user may feel the digital environment via the haptic feedback. Accordingly, examples disclosed herein provide feedback controllers for providing haptic feedback to a user, thereby allowing the user of the controller to receive haptic feedback from virtual objects, graphics, surfaces, etc., disposed within a virtual environment (e.g., such as a virtual reality environment). Accordingly, the example feedback controller disclosed herein may allow the user to more effectively "feel" the virtual environment and objects and features contained therein.

Figure 1:
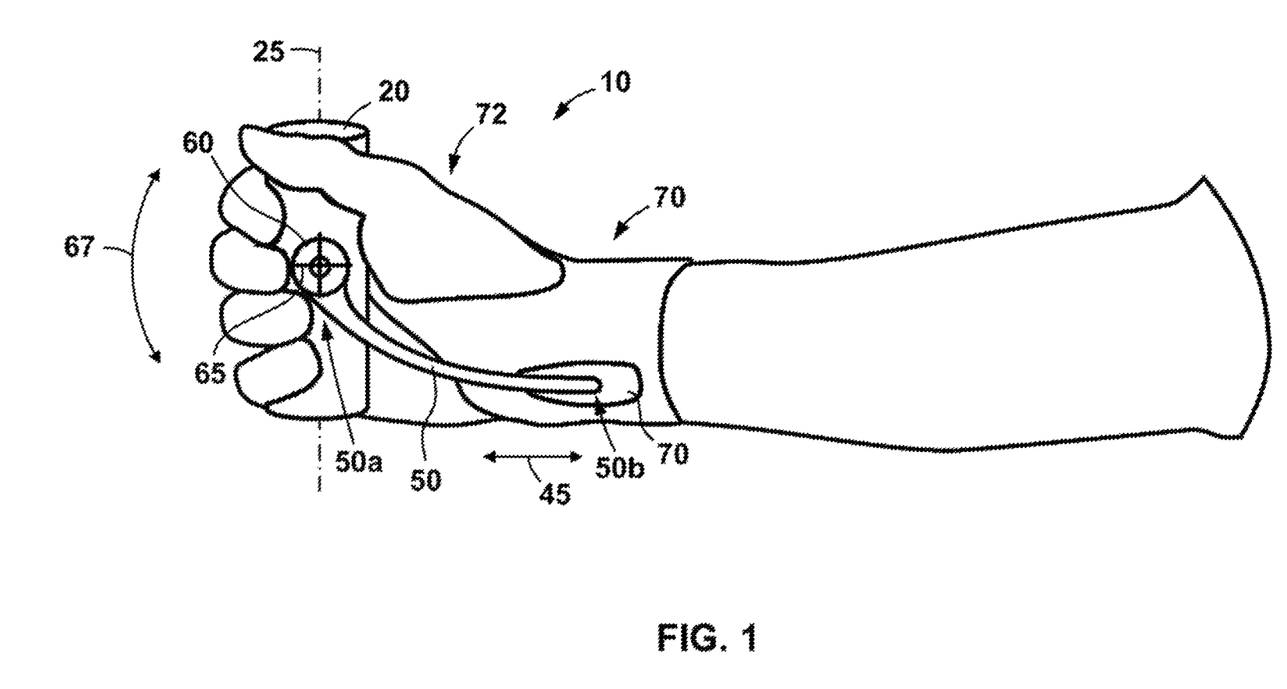
FIG. 1 is a side, perspective view of an example feedback controller disposed about a person's wrist and hand according to some implementations.
Figure 2:
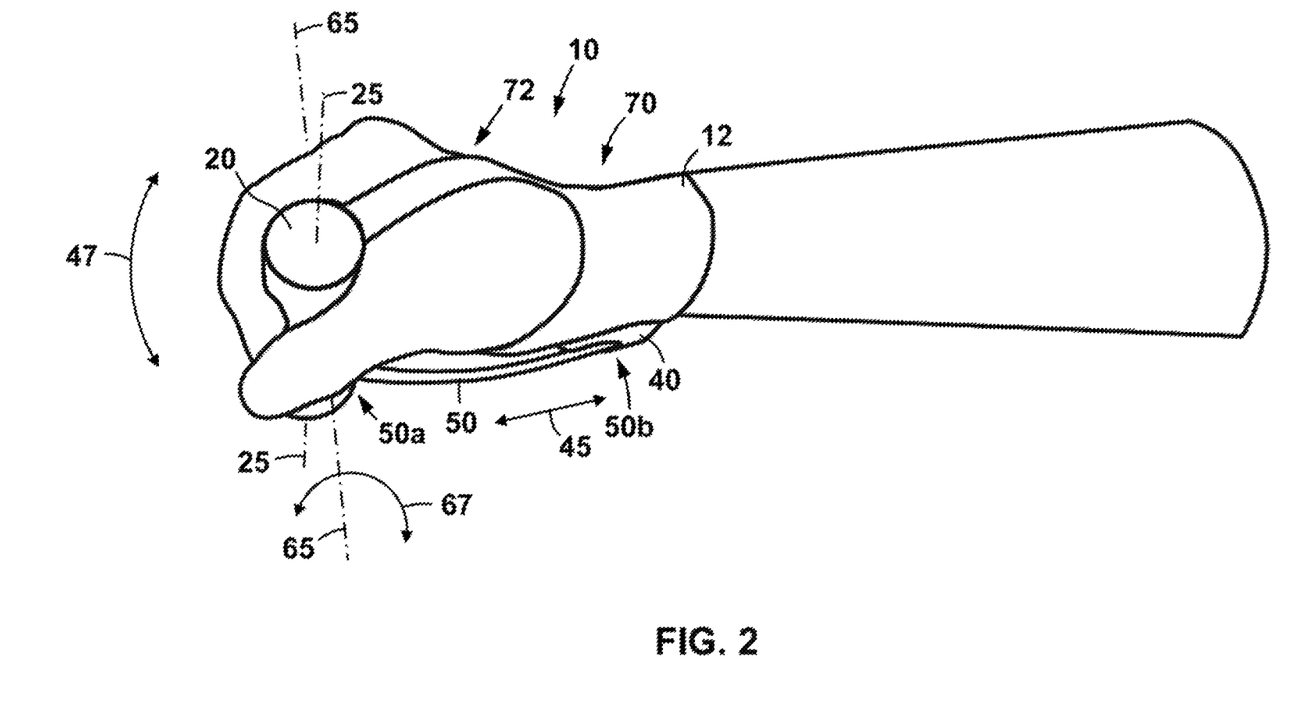
FIG. 2 is a top, perspective view of the example feedback controller of FIG. 1 according to some implementations.

Referring now to FIGS. 1 and 2, a feedback controller 10 for use with a computing device (not depicted in FIG. 1) is shown. Controller 10 generally includes a sleeve 12, a handle 20, and a pair of actuators 40, 60. As will be described in more detail below, actuators 40, 60 move (e.g., translate, rotate, respectively) handle 20 so that haptic feedback is transferred to a user's hand 72 and wrist 70 via controller 10 during operations.

Sleeve 12 is a deformable material (e.g., a fabric, polymer, etc.) that is disposable or wearable about a hand 72 and/or wrist 70 of a user. In this example, sleeve 12 resembles a glove and is disposed about the wrist 70 of the user's hand 72. Thus, sleeve 12 is referred to herein as a "wearable sleeve." In other examples, sleeve 12 may comprise a band that extends about wrist 70, and in still other examples, sleeve 12 may comprise a glove that fully encloses the user's hand 72 and wrist 70. In further examples, sleeve 12 may be disposed about a portion of the wrist 70 of a user (e.g., sleeve 12 may be disposed about the entirety of the user's wrist 70 or less than the entirety of the user's wrist 70). Thus, the specific shape, size, and arrangement of sleeve 12 may be widely varied in different examples. Further, sleeve 12 may be manufactured by any suitable method, such as, sewing. In some implementations, sleeve 12 may be manufactured through an additive manufacturing process, such as, for example, three dimensional (3D) printing.

First actuator 40 is mounted to sleeve 12, proximate wrist 70 (e.g., when sleeve 12 is worn or disposed about the hand 72 and wrist 70 of a user as shown in FIG. 1). An elongate member 50 (e.g., a rod) is coupled to the first actuator 40 and handle 20. In particular, elongate member 50 includes a first end 50a coupled to handle 20 and a second end 50b that is opposite first end 50a and coupled to first actuator 40. First actuator 40 is a linear actuator and is to selectively extend and retract elongate member 50 relative to first actuator 40, sleeve 12, and wrist 70. In particular, in this example, first actuator 40 is to selectively extend and retract first end 50a of elongate member 50 (and thus also handle 20) from and toward, respectively, first actuator 40, sleeve 12, and wrist 70 generally along the direction 45 shown in FIGS. 1 and 2. While elongate member 50 is generally curved in this example, it should be appreciated that elongate member 50 is substantially linear or straight proximate second end 50b. Accordingly, as actuator 40 translates elongate member 50 to extend and retract first end 50a along direction 45, handle 20 also translates generally in direction 45. During operations, the translation (specifically the retraction and extension) of handle 20 along linear direction 45 results in flexion and extension, respectively, of wrist 70.

As shown in FIG. 2, in some examples, elongate member 50 may be curved proximate second end 50b so that as first actuator 40 extends and retracts first end 50a of elongate member along direction 45, handle 20 is translated along an arcuate direction 47 as opposed to straight or linear direction 45. In these examples, the extension and retraction of first end 50a of elongate member 50 may still ultimately result in a flexion or extension of wrist 70 of the user during operations.

Figure 3:
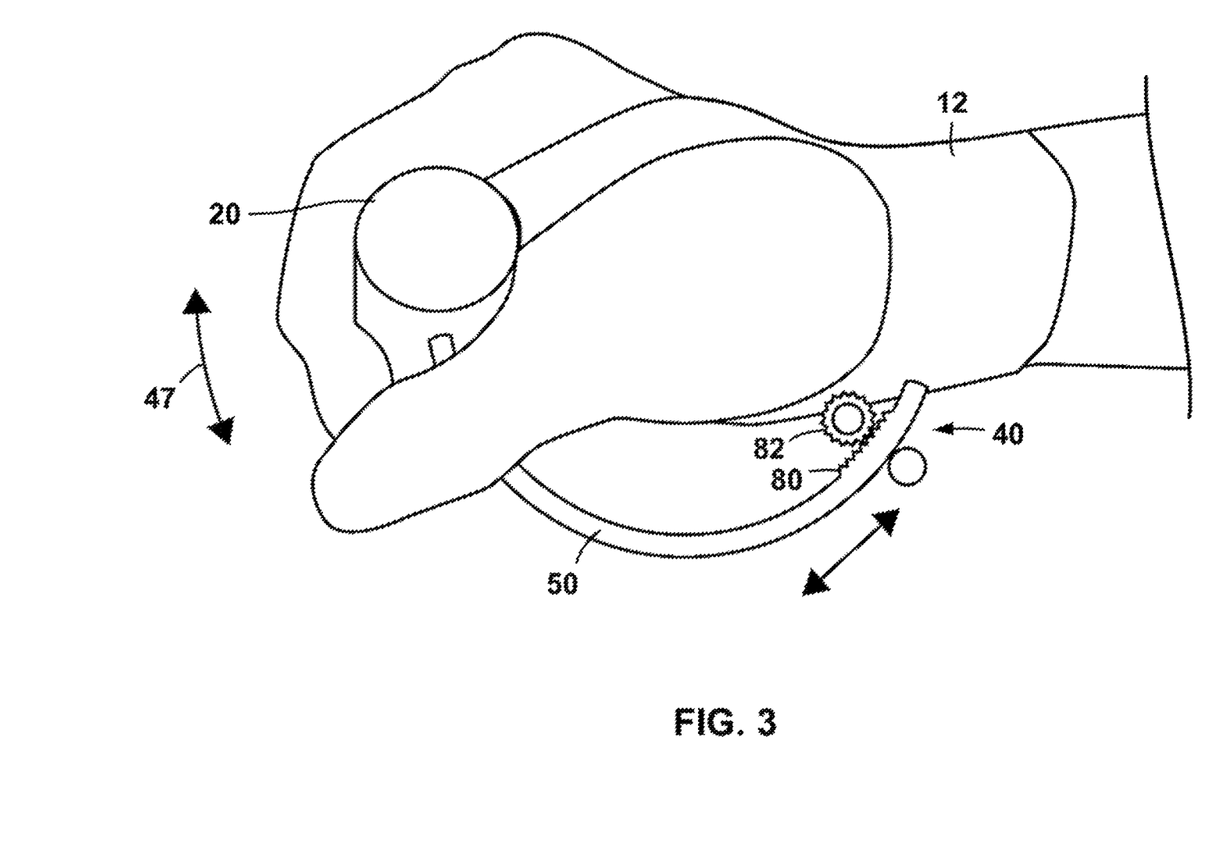
FIG. 3 is a schematic view of an example feedback controller disposed about a person's wrist and hand according to some implementations.

It should further be appreciated that in some implementations, the actuation of handle 20 along either linear or curved directions 45 or 47, respectively, can also be determined by other factors (either in addition to or in lieu of the shape of elongate member 50 proximate second end 50*b*). For example, the engagement between first actuator 40 and elongate member 50 and/or even the type of actuator used for first actuator 40 may be altered to affect the ultimate path or direction of first end 50*a* (and handle 20) in some implementations. In particular, referring briefly to FIG. 3, in some implementations, elongate member 50 may comprise a curved rack gear 80, and first actuator 40 may comprise a pinion gear 82, so that as pinion gear 82 is rotated and meshed with rack 80, handle 20 is translated along curved path 47.

Referring again to FIGS. 1 and 2, handle 20 is to be grasped by the hand 72 of a user, during operations. In this example, handle 20 is a substantially cylindrical member having a central or longitudinal axis 25. In other examples, handle 20 may be contoured so as to be comfortably gripped by hand 72 during operations. As previously described, handle 20 is coupled to first end 50*a* of elongate member 50. In particular, handle 20 is pivotably coupled to first end 50*a* of elongate member 50 via second actuator 60. Second actuator 60 is a rotary actuator that is to drive rotation or pivoting of handle 20 relative to elongate member 50 about an axis of rotation 65. In this example, axis 65 is orthogonal to axis 25 of handle 20; however, such a relationship may not be included in other implementations. Accordingly, second actuator 60 is to pivot handle 20 about axis 65 to thereby cause an ulnar and/or radial deviation of wrist 70 along arcuate direction 67 as shown in FIGS. 1 and 2.

Actuators 40, 60 may be any suitable driver or actuator. In some implementations, actuator 40 and/or actuator 60 is an electric motor (e.g., a servo motor). In other implementations, actuator 40 and/or actuator 60 is a pneumatic or hydraulic motor.

Also, it should be appreciated that handle 20 is not mounted directly to sleeve 12 in this implementations, and instead sleeve 12 is coupled to sleeve 12 via elongate member 50 and first actuator 40. During use (as shown in FIGS. 1 and 2), handle 20 may engage with a portion of sleeve 12 as result of the user's hand 72 grasping handle 20. However, such contact and engagement does not amount to the handle 20 being mounted directly to sleeve 12. By not directly mounting handle 20 to sleeve 12, second actuator 60 may freely pivot handle 20 about axis 65 without causing a deformation in sleeve 12.

Figure 4:
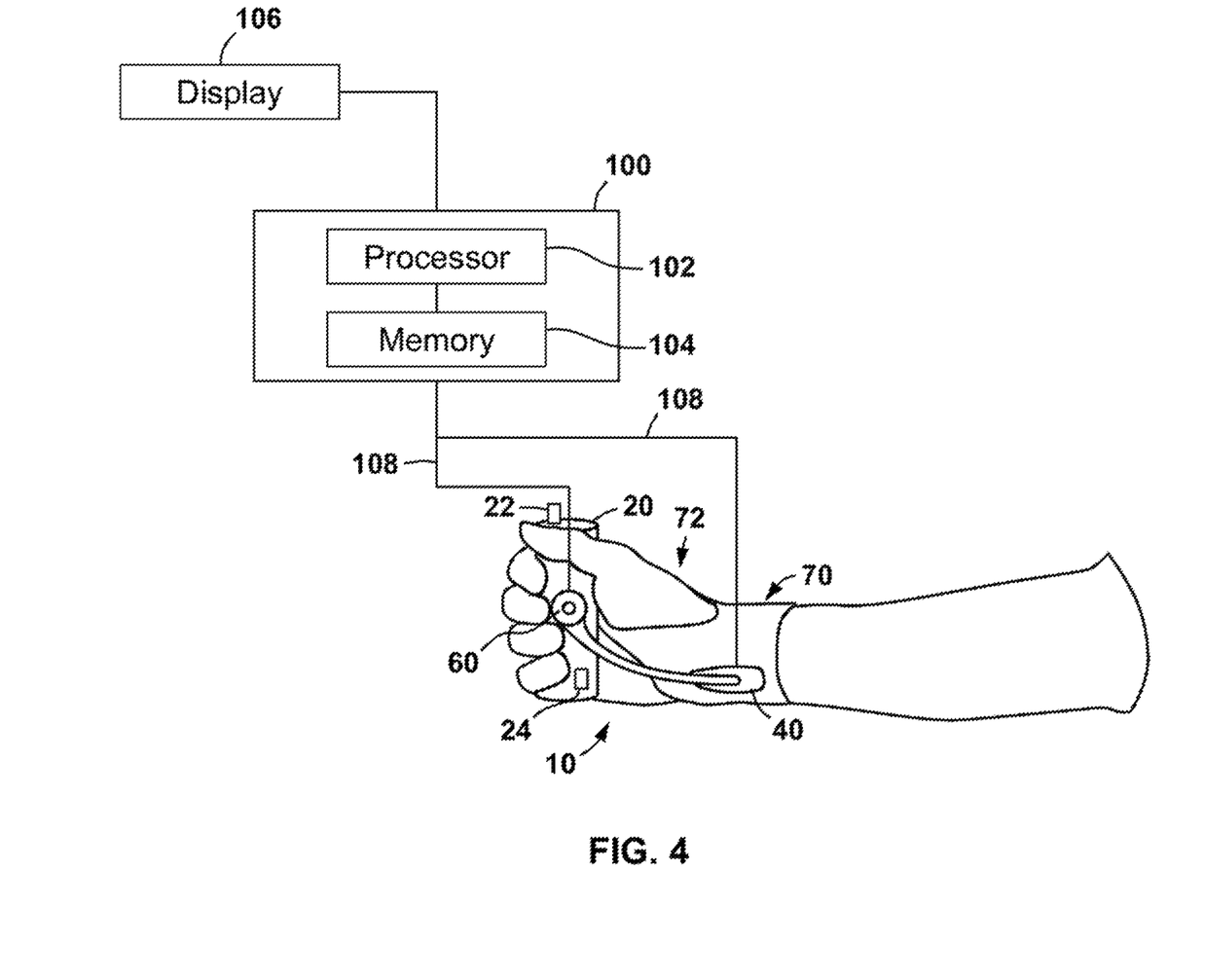
FIG. 4 is a schematic view of the example feedback controller of FIG. 1 coupled to a computing device and display according to some implementations.

Referring now to FIG. 4, feedback controller 10 may be coupled to a computing device 100, such that actuators 40, 60 may be actuated via commands issued from computing device 100 to translate and/or rotate handle 20 as desired. Computing device 100 may comprise any suitable device operable to execute machine readable instructions and to issue commands for actuating a motor, driver, or other actuator (e.g., actuators 40, 60). In some examples, computing device 100 may comprise a desk top computer, laptop computer, smartphone, tablet, etc. In particular, in this example, computing device 100 includes a processor 102 and a memory 104.

The processor 102 (e.g., microprocessor, central processing unit, or collection of such processor devices, etc.) executes machine readable instructions provided on memory 104. Upon executing the machine readable instructions on memory 104, processor 102 provides the computing device 100 with all of the functionality described herein. The memory 104 may comprise volatile storage (e.g., random access memory), non-volatile storage (e.g., flash storage, read only memory, etc.), or combinations of both volatile and non-volatile storage. Data consumed or produced by the machine readable instructions can also be stored on memory 104.

Computing device 100 is communicatively coupled or linked to the actuators 40, 60, by a plurality of conductors 108, which may comprise any suitable conductive element for transferring power and/or control signals (e.g., electrical signals, light signals, etc.). For example, in some examples, conductors may comprise conductive wires (e.g., metallic wires), fiber optic cables, or some combination thereof. In other examples, computing device 100 is to communicate with the actuators 40, 60 via a wireless connection (or coupling) or multiple such connections (e.g., WIFI, BLUETOOTH®, near field communication, infrared, radio frequency communication, etc.).

In addition, in this example, computing device 100 is coupled to (or includes) a display 106. Display 106 may be any suitable device or component for visually displaying information, graphics, images, etc., for viewing by a user. For example, in some implementations, display 106 may comprise a computer monitor. In other examples, display 106 may comprise a virtual reality headset (or may be incorporated within such a headset). Display 106 may utilize any suitable display technology, such as, for example, liquid crystal display (LCD) technology, light emitting diode (LED) technology, plasma display technology, projection display technology, etc.

Display 106, computing device 100, and feedback controller 10 may each utilize a common power source (e.g., battery, capacitor, wall plug, etc.). However, in other implementations, display 106, computing device 100, and/or feedback controller 10 may each utilize an individual, dedicated power source.

During operations, computing device 100 (e.g., via machine readable instructions executed by processor 102) issues commands (e.g., control signals) to actuators 40, 60 in order to induce a desired movement of handle 20 and thereby a desired tactile force or feedback to the user's hand 72 and wrist 70. As will be described in more detail below, the commands provided to actuators 40, 60 via computing device 100 are to impart tactile or haptic feedback to the user's hand 72 and wrist 70 based on interactions between the user and digital images, objects, surfaces, etc., viewed by the user on the display 106.

Referring still to FIG. 4, in some examples, computing device 100 produces a virtual reality environment that is viewed by the user on display 106. As previously described, in these examples, display 106 (and possibly also computing device 100) may be incorporated within a virtual reality headset (not shown) that is worn by the user. In some of these examples, the user may use the feedback controller 10 to interact with and manipulate the virtual environment. In particular, in these examples, controller 10 may further include user interface components or devices 22 coupled to handle 20 to allow the user to provide inputs (e.g., cursor or character movement, option selection, etc.) within the virtual environment. The user interface devices 22 may include, for example, buttons, touch sensitive surfaces, joysticks, etc. In addition, in some examples, a sensor or sensors (e.g., motion sensor, inertial sensors, gyroscopes, etc.) 24 may be coupled to handle 20 (or some other portion of controller 10) that may provide input to computing device 100 for the movement of a virtual object (e.g., a hand, cursor, tool, etc.) within the virtual environment produced by display 106. As a result, the movement of controller 10 within the physical space (which is sometimes referred to as the "meat space") may also correspond with a corresponding movement (e.g., of a cursor, virtual hand or tool, etc.) within the virtual environment produced by computing device 100 and viewed by the user on display 106 during operations. It should be appreciated that both user interface devices 22 and sensors 24 may be coupled to computing device 100 via conductors 108 or a wireless connection as previously described above for actuators 40, 60.

Referring generally now to FIGS. 4-7, as a user interacts with the virtual environment depicted by display 106, computing device 100 provides commands to induce movements of actuators 40, 60 that represent haptic feedback to handle 20 (and thus user's hand 72) from the virtual environment.

Figure 5:
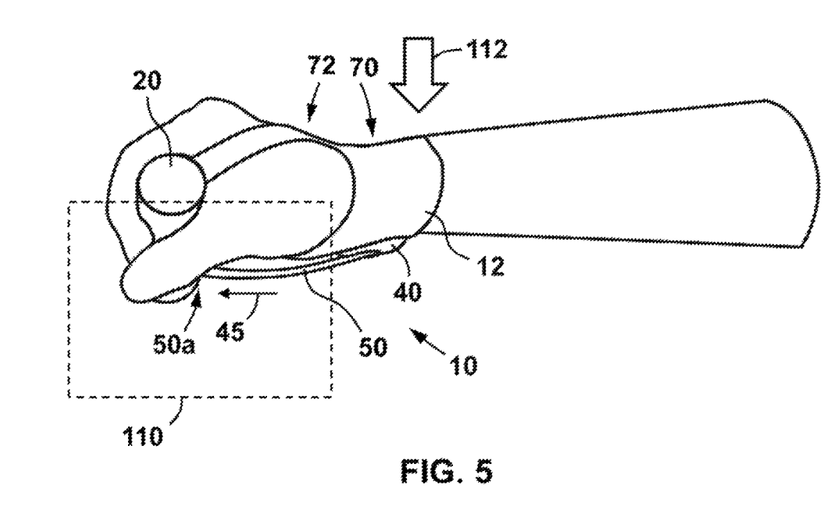
FIGS. 5-7 are schematic views showing the example feedback controller of FIG. 1 during interaction by the user with a virtual object according to some implementations.

For instance, referring specifically to FIGS. 4 and 5, as a user moves controller 10 to push a virtual object 110 (e.g., an object disposed within the virtual environment generated by computing device 100 and depicted by display 106) along direction 112 which corresponds to pushing the virtual object 110 laterally across the front of the user's body, computing device 100 (particularly processor 102) may issue a command (or commands) to first actuator 40 to extend first end 50a of elongate member 50 from wrist 70, and thus also handle 20, along direction 45. As previously described, the extension of handle 20 results in an extension of wrist 70.

Figure 6:
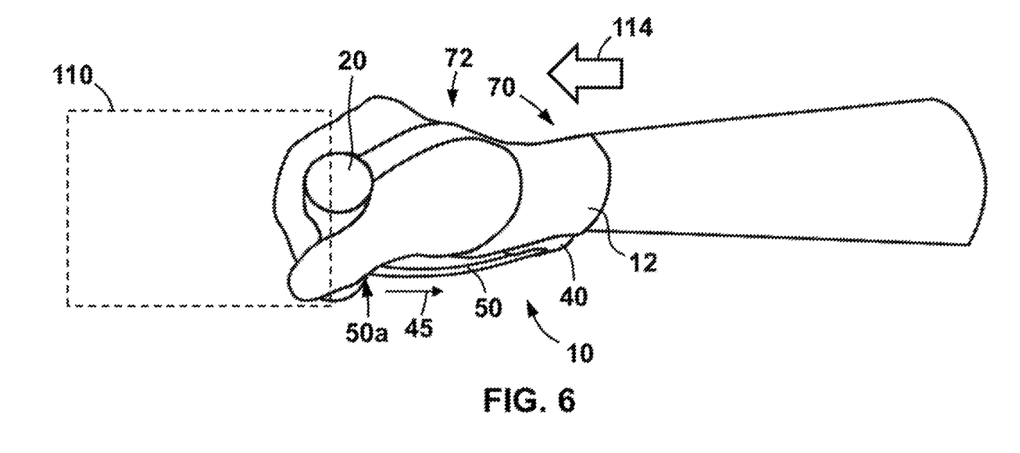

Referring now to FIGS. 4 and 6, as the user moves controller 10 to push the virtual object 110 along a direction 114 which corresponds to pushing an object directly away from the user, computing device 100 (particularly processor 102) may issue a command (or commands) to first actuator 40 to retract first end 50a of elongate member 50 toward wrist 70, and thus also handle 20, along path 45. This retraction of elongate member 50 along path 45 causes a movement (specifically a translation) of handle 20 and hand 72 along direction 45, and thus also a flexion of wrist 70.

The above described movements of handle 20 and hand 72 by actuator 40 and elongate member 50 may provide the user with a feeling of resistance of the virtual object 110 to the movement along directions 112, 114 (see FIGS. 5 and 6). In addition, while not specifically shown, it should be appreciated that the movement of the virtual object 110 along direction 114 as shown in FIG. 6 may also cause computing device 100 to issue a command (or commands) to second actuator 60 to rotate handle 20 about axis 65 (i.e., along arcuate path 67 shown in FIGS. 1 and 2) to thereby result in either a ulnar or radial deviation of wrist 70. Such a rotation of handle 20 by computing device 100 may further provide the user with a feeling of resistance from the virtual object 110 as previously described for movement of handle 20 by actuator 40.

Figure 7:
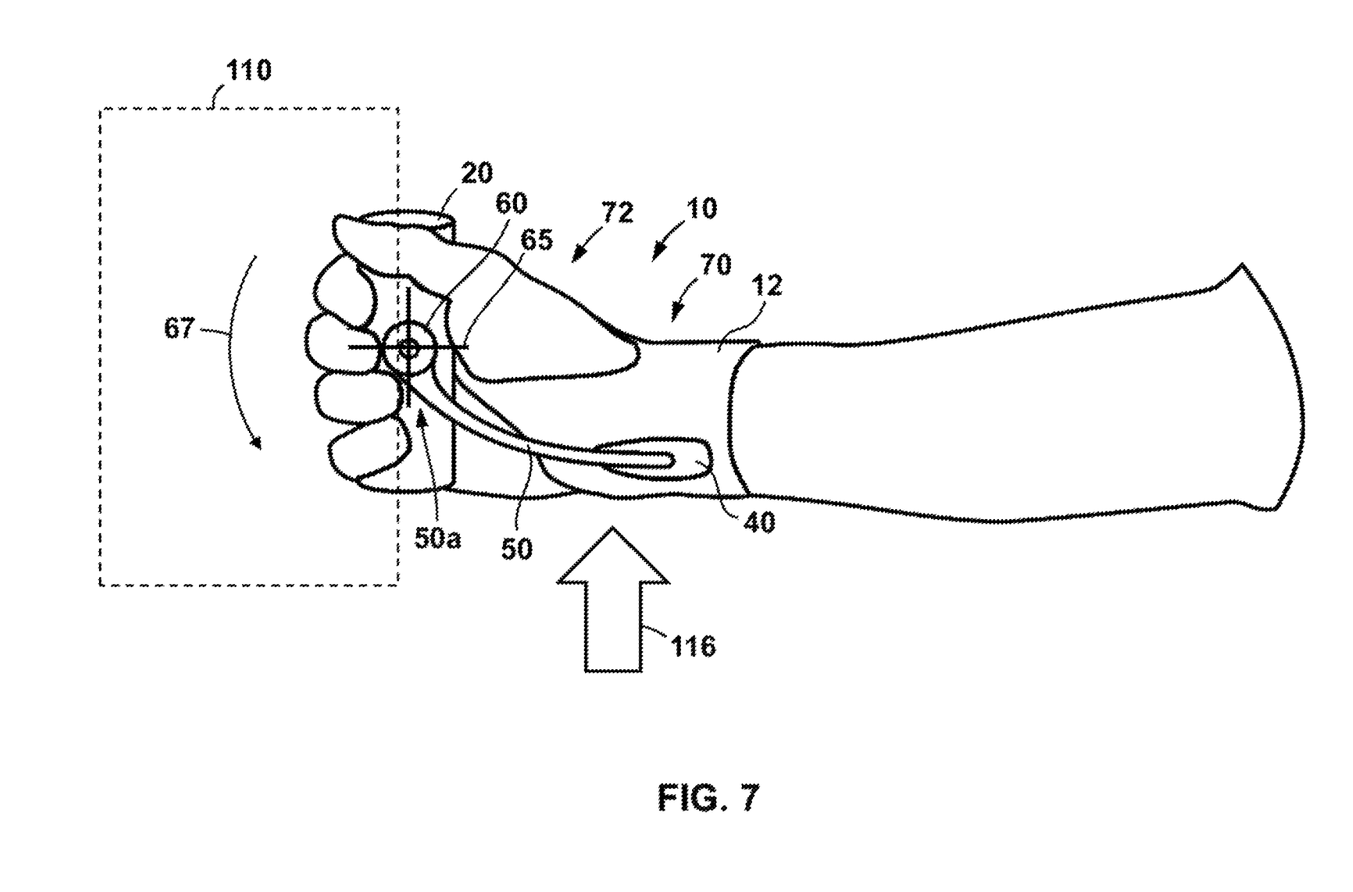

Referring now to FIGS. 4 and 7, if a user lifts or picks up virtual object 110 along direction 116 (e.g., which may be opposite the force of gravity), the computing device 100 may issue a command (or commands) to second actuator 60 to rotate or pivot handle 20 about axis 65 downwardly (or in a counter-clockwise direction as shown in FIG. 7) to result in an ulnar deviation of wrist 70. This movement of handle 20 by second actuator 60 may provide a feeling of weight to the user of the virtual object 110 while it is being lifted along direction 116 within the virtual environment.

The examples disclosed herein have included feedback controllers for providing haptic feedback to a user, thereby allowing a user of the controller to receive haptic feedback from virtual objects, graphics, and surfaces, disposed within a virtual environment. Accordingly, use of the example feedback controllers disclosed herein may allow the user to more effectively "feel" the virtual environment and objects and features contained therein, such that a users overall experience is enhanced.

While examples of the feedback controller 10 shown herein have included first and second actuators 40 and 60, respectively, that are disposed at separate locations along controller 10, it should be appreciated that in other examples, the locations of actuators 40, 60 may be varied. For example, in some implementations, actuators 40, 60 may be mounted at the same (or close to the same) location within controller 10, such as at or proximate handle 20. Thus, the depicted, precise location of the actuators 40, 60 is merely illustrative of some example implementations.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A feedback controller for a computing device, the controller comprising:
    a sleeve to be disposed about a portion of a user's wrist;
    a handle to be grasped by the user's hand, the handle including a first end, a second end that opposes the first end, and an axis that extends longitudinally along the handle between the first end and the second end;
    a first actuator coupled to the handle and the sleeve, the first actuator to translate the handle relative to the sleeve; and
    a second actuator coupled to the handle, the second actuator to rotate the handle relative to the sleeve about a rotational axis that is substantially orthogonal to the axis of the handle, the rotational axis positioned between the first end and the second end.

2. The feedback controller of claim 1, comprising a second actuator coupled to the handle, wherein the first actuator is to translate the handle relative to the sleeve, and wherein the second actuator is to rotate the handle about an axis.

3. The feedback controller of claim 2, comprising an elongate member coupled to the handle, wherein the first actuator is to extend and retract the elongate member, and wherein the second actuator is to rotate the handle about the axis relative to the elongate member.

4. The feedback controller of claim 3, wherein the elongate member is coupled to the sleeve with the first actuator.

5. The feedback controller of claim 3, wherein the first actuator and the second actuator are to be communicatively coupled to the computing device, and wherein the first actuator and the second actuator are to actuate based on commands from the computing device.

6. A feedback controller for a computing device, the controller comprising:
    a handle that is to be grasped by a hand of a user, the handle including a first end, a second end that opposes the first end, and an axis that extends longitudinally along the handle between the first end and the second end;
    a first actuator coupled to the handle, wherein the first actuator is to be coupled to a wrist of the user and is to be communicatively coupled to the computing device, and wherein the first actuator is to translate the handle based on a first command from the computing device; and
    a second actuator coupled to the handle, the second actuator to rotate the handle about a rotational axis that is substantially orthogonal to the axis of the handle, the rotational axis positioned between the first end and the second end.

7. The feedback controller of claim 6, comprising a second actuator coupled to the handle, wherein the second actuator is to be communicatively coupled to the computing device, wherein the first actuator is to translate the handle based on the first command, and wherein the second actuator is to rotate the handle about an axis based on a second command from the computing device.

8. The feedback controller of claim 7, wherein the handle is coupled to an elongate member, wherein the first actuator is to translate the handle by actuating the elongate member.

9. The feedback controller of claim 8, wherein the first actuator is to extend and retract the elongate member.

10. The feedback controller of claim 8, wherein the handle is rotatably coupled to the elongate member, and wherein the second actuator is to rotate the handle about the axis relative to the elongate member.

11. The feedback controller of claim 7, comprising a sleeve that is to cover a portion of the wrist, wherein the first actuator is mounted to the sleeve.

12. A feedback controller for a computing device, the controller comprising:
a wearable sleeve;
a first actuator coupled to the wearable sleeve;
an elongate member coupled to the first actuator;
a handle rotatably coupled to the elongate member; and
a second actuator coupled to the handle,
wherein the first actuator is to extend and retract the elongate member to translate the handle, and
wherein the second actuator is coupled to the elongate member and is to rotate the handle about an axis relative to the elongate member.

13. The feedback controller of claim 12, wherein the first actuator and the second actuator are to be communicatively coupled to the computing device, and wherein the first actuator and the second actuator are to actuate based on commands from the computing device.

14. The feedback controller of claim 12, wherein extension and retraction of the elongate member by the first actuator is to cause extension and flexion of a wrist of a user, wherein rotation of the handle by the second actuator is to cause ulnar deviation and radial deviation of the wrist.

* * * * *